Feb. 19, 1952      E. T. CLARKE      2,586,303
RADIATION TYPE THICKNESS GAUGE
Filed Jan. 4, 1951
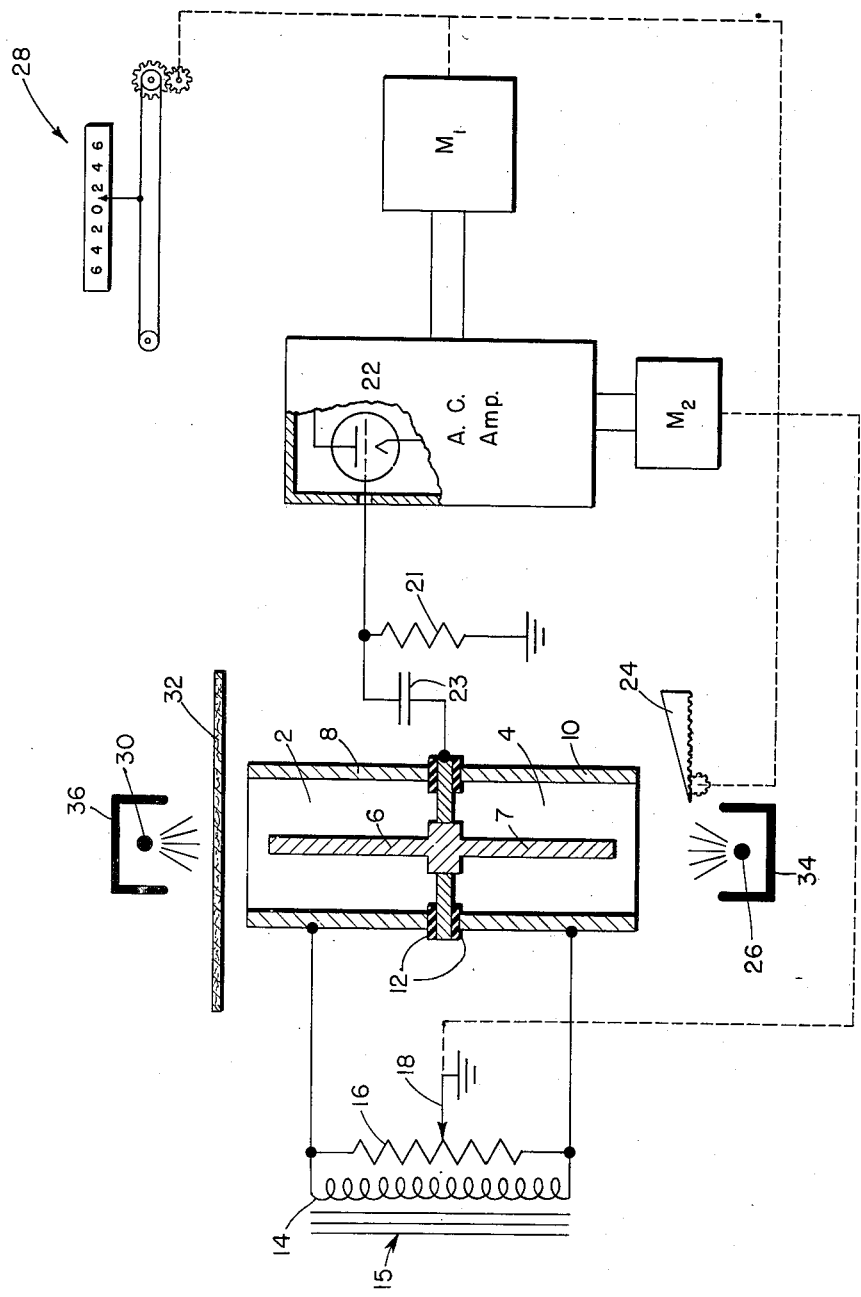
Eric T. Clarke
Inventor
by W. R. Hulbert
Attorney Patented Feb. 19, 1952

2,586,303

UNITED STATES PATENT OFFICE 2,586,303

RADIATION TYPE THICKNESS GAUGE

Eric T. Clarke, Lexington, Mass., assignor to Tracerlab, Inc., Boston, Mass., a corporation of Massachusetts Application January 4, 1951, Serial No. 204,417

5 Claims. (Cl. 250—83.3)

This invention relates to radiation type thickness gauges using the principle of the relation between the thickness of the absorbing material and its ability to transmit penetrative radiations. More particularly, it is concerned with a new and improved radiation type thickness gauge of the comparator type in which the thickness of the material is determined by continuously comparing the intensity of penetrative radations attenuated by the material with the intensity of radiations not so attenuated, the instrument being so constructed as to permit the use of alternating current throughout.

Because of the nature of the relationship between the thickness of the absorbing material and its ability to transmit radiations, it is evident that the quantity of interest is only the ratio of incident to emergent flux. A measurement of this ratio will yield the thickness of the material independent of the absolute flux involved. Most instruments heretofore constructed have been designed to measure absolute flux emergent from the absorber and at intervals to measure the absolute flux with no absorber in the radiation beam, thus periodically standardizing the instrument. An obvious disadvantage of this system lies in its possibility of error if the incident flux or the sensitivity of the detector should vary during the time interval between standardizations.

Another difficulty from which most prior art radiation type thickness gauges suffer is that of direct current operation. D. C. amplifiers are subject to large drifts, both in zero reading and in amplification factor, and, moreover, generally require batteries. Even if the original D. C. voltage resulting from the commonly used ionization chamber detector is converted into alternating current by means of a chopper or oscillating capacitor and then amplified by the far more stable A. C. amplifier, drifts may easily result in the initial stage where the signal is still a direct current. The batteries needed for most such instruments must operate with negligible voltage change over long periods of time, making for great bulk and frequent servicing.

The present invention overcomes these two principal drawbacks, first by operating on the comparison principle, depending solely upon the ratio heretofore discussed rather than the measurement of the absolute intensity of emergent flux with periodic standardizations, and second by permitting successful alternating current operation with attendant inherent advantages.

The device, according to the invention, realizes the objective of eliminating periodic standardizations by providing a pair of radiation detectors of the type having accelerating and collecting electrodes, one of which is exposed to a beam of radiations from a radioactive source after attenuation by the material undergoing measurement, and the second of which is exposed to a similar beam not so attenuated. The two detectors are so connected that their output currents tend to balance and nullify each other, any difference in the same being reflected as a net output error signal. This signal is fed to a device for adjusting the intensity of radiations striking one of the detectors until the two ionization currents are balanced and the error signal substantially eliminated. It is evident that by appropriately calibrating the adjusting device, its position may be utilized as a measure of the thickness of the material being tested, using the comparison principle above referred to, and the results will be independent of the absolute value of flux emergent from the tested material.

The second principal objective, namely, permitting successful alternating current operation, is achieved in the following manner: The accelerating electrodes are connected to opposite sides of an alternating current circuit. The error signal referred to in the previous paragraph will therefore be alternating. Since the collectors are connected in common, as previously explained, the capacitive currents to each collector will also tend to oppose and balance each other, any unbalance being reflected as a second net error signal, 90° out of phase with the previously mentioned error signal. A device sensitive to this signal is arranged continuously to balance the capacitive currents, substantially eliminating the error signal.

Since the capacitive currents in each detector are determined by the relative voltage of the accelerating electrodes with respect to the collectors, current balance may be achieved by tying collector voltage to the electrical mid point of the activating alternating current circuit. That is to say, when the positive and negative ionization currents in the two detectors are exactly in balance, i. e. equal and opposite at any given time, the collector voltage is zero A. C., and at a D. C. value midway between the peak voltages on the two accelerating electrodes. By providing the A. C. circuit with a variable neutral connector at or near its electrical mid point connected to a suitable circuit by which its position may be used to control relative A C. voltages on the collectors, and means for causing the connector to seek such mid point there is provided an automatic device for continuously balancing capacitive currents in the two detectors.

In one embodiment of the invention the A. C. input circuit comprises the secondary of a transformer having a variable center tap or a potentiometer bridging its poles, the arm being arranged to seek the electrical mid point of the circuit under the direction of the balancing device. This arm or center tap is connected to the ground or lower terminal of the output amplifier, and natural leakage currents from the collectors are employed to secure the desired results. Alternatively, a high resistance may be connected between the potentiometer arm and the center electrodes.

Since the two error signals will be 90° out of phase with each other, appropriate phase sensitive devices may be employed for simultaneously balancing the two sets of currents by varying the flux striking one of the chambers and moving the connector to the mid point of the A. C. circuit.

For a more complete understanding of the invention, reference is now made to the accompanying drawing disclosing a preferred embodiment thereof, using a pair of ion chambers as detectors.

In the specific embodiment disclosed, there are employed two ionization chambers 2 and 4 having their collecting electrodes 6 and 7 connected to each other and their accelerating or outer electrodes 8 and 10 isolated from each other by a pair of insulating rings 12 which support the central electrodes 6 and 7. The physical characteristics of the two chambers are preferably as similar as possible, thus making changes of temperature, pressure, contact potentials, etc., as alike as possible in the two chambers.

The outer electrodes 8 and 10 are connected to opposite ends of the secondary winding 14 of a transformer 15, which is either provided with a variable center tap (not shown) or, preferably, bridged by a potentiometer 16, whose contact arm 18 will seek the approximate electrical mid point of the secondary circuit, as explained below. The primary (not shown) of the transformer is connected to an A. C. power main and the voltage of the secondary is such as to yield saturation ionization currents in the chambers during most of the A. C. cycle. A high resistor may be connected between the common center electrodes and the arm 18 of the potentiometer, or, alternatively, natural leakage (as shown in the present case) may be employed.

The central collectors are capacitance coupled to the high resistance input of a high-gain A. C. amplifier shown schematically at 22, and any A. C. voltage appearing on the collectors will thereby be amplified. The resistor 21 may have a value of $10^9$ ohms and the capacitor 23 may have a value of 100 mmf. The output of the amplifier is fed to the windings of two phase-sensitive motors $M_1$ and $M_2$, one of which is geared to adjust a variable shield 24 to control the intensity of flux which strikes the chamber 4 from a standard radioactive source 26, the other to drive the potentiometer arm 18 across the transformer. The output drive of the motor $M_1$ is calibrated in such a way that each revolution of the motor armature produces a predetermined change in the intensity of radiation impinging upon the chamber 4 and the position of the armature is shown by an indicating mechanism 28. The other chamber 2 views the flux from a second source 30 so arranged that the intensity of the flux reaching the chamber is attenuated by the material 32 under test. The sources 26 and 30 are preferably of the same material (to decay at the same rate) and are enclosed in appropriate shields 34 and 36. Sr-90 is suitable source material, although it is evident that other sources of penetrative radiations may be employed dependent upon the characteristics of the material being measured and the particular results desired.

Analysis of the operation of the circuit shows that the error signal at the input to the amplifier will consist of two components: one alternating voltage, in phase with the chamber voltage, whose amplitude is proportional to any unbalance in the capacitive currents flowing across the two chambers; and a second alternating voltage, 90° out of phase with the chamber voltage, whose amplitude is proportional to the difference in ionization currents flowing in the two chambers.

Capacitive balance is achieved by varying the tap 18 until capacitive currents to each collector exactly balance. The position of the tap 18 determines the relative voltage of the accelerating electrodes with respect to the center collector, thereby determining the capacitive current to each. Ionization current balance is made by adjustment of the reference source 26, which is moved until positive and negative ion currents in the two chambers are equal and opposite at all times. When this occurs, the voltage of the collector is zero A. C. and at a value of D. C. midway between the peak voltage on the two accelerating electrodes.

Hence, if the two motors are connected such that the one driving the potentiometer is sensitive to the component in phase (or 180° out of phase) with the chamber voltage, and the other 90° out of phase, the first motor will correct for any unbalance in capacitance while the second will adjust the source strength in the reference chamber until its ionization current equals that in the test chamber. The two balancing operations should be independent of each other, and will proceed simultaneously and continuously.

The complete system therefore behaves as a continuously self-balancing A. C. bridge. The thickness of the material under test is given by the position of the adjustable source. No D. C. voltages are necessary for operation. The only requirements for stability are that the two chambers respond identically to external influences such as temperature, pressure, humidity, that the two sources decay with the same half life, and that the physical position of the reference source be reproducible.

While there is here disclosed a preferred embodiment of the invention, it will be evident that various modifications and changes may occur to those skilled in the art, yet within the spirit and scope of the appended claims.

For example, it is evident that the flux from either source may be subject to the control of the motor $M_1$, indeed it is possible to arrange the chambers in such a way as to view two beams of radiation emanating from a single source, one beam being regulated by the adjusting device. Furthermore, while the invention has been illustrated as employing radio-isotopes as sources it will be evident that other sources of penetrative radiations may be used. Likewise an A. C. input circuit other than the transformer and slide wire here disclosed may be substituted therefor.

Having disclosed my invention I claim and wish to secure by Letters Patent:

1. In a radiation type thickness gauge in which the intensity of radiations, after attenuation by the material being measured, is compared with the intensity of similar radiations not so attenuated, the combination which comprises: a pair of substantially identical radiation detectors of the type having an accelerating electrode and a collecting electrode, the accelerating electrodes being connected to opposite poles of an A. C. circuit and the collecting electrodes being joined together electrically, whereby capacitive and ionization currents flowing in one of said detectors will oppose and tend to balance corresponding currents in the other detector, any difference between said two sets of opposing currents being reflected as net output error signals 90° out of phase with each other, means for irradiating each of said detectors with penetrative radiations, the intensity of radiations reaching one of said detectors being attenuated by said material, and means responsive to said error signals for simultaneously and continuously balancing said two sets of opposing currents to substantially eliminate said error signals, said means including a calibrated device for varying the intensity of radiations reaching one of said detectors, whereby the position of said device will be a measure of thickness of said material, and also including means for controlling the potential of said collecting electrodes to correspond with the electrical mid point of said A. C. circuit.

2. In a radiation type thickness gauge in which the intensity of radiations, after attenuation by the material being measured, is compared with the intensity of similar radiations not so attenuated, the combination which comprises: a pair of substantially identical radiation detectors of the type having an accelerating electrode and a collecting electrode, the accelerating electrodes being connected to opposite poles of an A. C. circuit and the collecting electrodes being joined together electrically, whereby capacitive and ionization currents flowing in one of said detectors will oppose and tend to balance corresponding currents in the other detector, any difference between said two sets of opposing currents being reflected as net output error signals 90° out of phase with each other, means for irradiating each of said detectors with penetrative radiations, the intensity of radiations reaching one of said detectors being attenuated by said material, an A. C. amplifier for receiving and amplifying said error signals, phase sensitive devices controlled by the amplifier output for continuously balancing said two sets of currents, each of said devices being responsive to one of said error signals, one of said devices being calibrated and arranged to vary the intensity of radiations reaching one of said detectors to balance said ionization currents to substantially eliminate the error signal thereof, whereby its position will be a measure of thickness of said material, and the other device being arranged to maintain the potential of said collecting electrodes at a neutral value corresponding to the electrical mid point of said A. C. circuit, to balance said capacitive currents and substantially eliminate the error signal thereof.

3. In a radiation type thickness gauge in which the intensity of radiations, after attenuation by the material being measured, is compared with the intensity of similar radiations not so attenuated, the combination which comprises a pair of substantially identical radiation detectors of the type having an accelerating electrode and a collecting electrode, the accelerating electrodes being connected to opposite poles of an A. C. circuit having a variable center tap and the collecting electrodes being joined together electrically, whereby capacitive and ionization currents flowing in one of said detectors will oppose and tend to balance corresponding currents in the other detector, any difference between said two sets of opposing currents being reflected as net output error signals 90° out of phase with each other, means for irradiating each of said detectors with penetrative radiations, the intensity of radiations reaching one of said detectors being attenuated by said material, an A. C. amplifier coupled to said collecting electrodes for receiving and amplifying said error signals and having its lower input terminal connected to said center tap, and phase sensitive devices controlled by the amplifier output for continuously balancing said two sets of currents, each of said devices being responsive to one of said error signals, one of said devices being calibrated and arranged to vary the intensity of radiations reaching one of said detectors to balance said ionization currents to substantially eliminate the error signal thereof, whereby its position will be a measure of thickness of said material, and the other device being arranged to maintain the potential of said collecting electrodes at a neutral value corresponding to the electrical mid point of said A. C. circuit by driving said center tap to seek such mid point, to balance said capacitive currents and substantially eliminate the error signal thereof.

4. A radiation type thickness gauge for A. C. operation, comprising a pair of ionization chambers connected in opposition to each other, means for impressing an A. C. collecting field on each of said chambers, means for continuously balancing the capacitative currents flowing in said chambers, means for irradiating said chambers with beams of similar penetrative radiations, one of said beams being attenuated by the material being measured, and calibrated means for adjusting the intensity of one of said beams until the ionization current outputs of said chambers balance each other, whereby the position of said calibrated means will be a measure of the thickness of said material.

5. In a radiation type thickness gauge in which the intensity of radiations after attenuation by the material being measured, is compared with the intensity of radiations not so attenuated, the combination which comprises: a pair of substantially identical ionization chambers, a pair of similar radioactive sources each arranged to irradiate one of said chambers, the intensity of incident radiation from one of said sources being attenuated by the material being tested, said chambers having their accelerating electrodes connected to opposite poles of the secondary of a transformer and their collecting electrodes joined together electrically, whereby the capacitative and collected currents in one chamber will oppose the corresponding currents in the other chamber, any unbalance thereof being reflected as net error signals 90° out of phase with each other, an A. C. amplifier coupled to said collecting electrodes for amplifying said error signals, a potentiometer bridging the poles of said transformer, the arm of said potentiometer being connected through a circuit by which its position will control the potential of said collecting electrodes for balancing said capacitive currents, a variable shield for attenuating the incident radiation from one of said sources for balancing said ionization currents, and a pair of phase sensitive motors controlled by said amplifier, the first arranged to drive said potentiometer arm and the second to adjust said shield in response to said error signals to balance said two sets of currents and thereby substantially eliminate said signals, whereby the position of said shield will be a measure of thickness of said material.

ERIC T. CLARKE.

REFERENCES CITED

The following references are of record in the file of this patent:

UNITED STATES PATENTS

| Number | Name | Date |
|---|---|---|
| 2,094,318 | Failla | Sept. 28, 1937 |
| 2,097,760 | Failla | Nov. 2, 1937 |
| 2,264,725 | Shoupp et al. | Dec. 2, 1941 |
| 2,467,812 | Clapp | Apr. 19, 1949 |